United States Patent
Nashiki et al.

(10) Patent No.: US 7,781,048 B2
(45) Date of Patent: Aug. 24, 2010

(54) TRANSPARENT CONDUCTIVE MULTILAYER BODY

(75) Inventors: Tomotake Nashiki, Ibaraki (JP); Hideo Sugawara, Ibaraki (JP); Hidetoshi Yoshitake, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 270 days.

(21) Appl. No.: 11/464,920

(22) Filed: Aug. 16, 2006

(65) Prior Publication Data

US 2007/0091074 A1  Apr. 26, 2007

(30) Foreign Application Priority Data

Oct. 20, 2005  (JP)  ............................. 2005-305761

(51) Int. Cl.
*B32B 27/00* (2006.01)
(52) U.S. Cl. ...................... 428/212; 428/690; 428/917; 313/504; 313/506; 257/431; 257/449
(58) Field of Classification Search ................. 428/212, 428/690, 917; 313/504, 506; 257/431, 449
See application file for complete search history.

(56) References Cited

U.S. PATENT DOCUMENTS 5,645,901 A * 7/1997 Fukuchi et al. .............. 428/1.4
6,399,222 B2 * 6/2002 Arai et al. .................... 428/690
6,611,090 B1 * 8/2003 Ishikawa et al. ............. 313/461

FOREIGN PATENT DOCUMENTS

| JP | 8-132554 A | 5/1996 |
|---|---|---|
| JP | 2002-117724 A | 4/2002 |
| JP | 2003-320609 A | 11/2003 |

OTHER PUBLICATIONS

Chinese Office Action dated Aug. 14, 2009, issued in corresponding Chinese Patent Application No. 200610112190.1.
Taiwanese Office Action dated Nov. 27, 2009, issued in corresponding Taiwanese Patent Application No. 095129746.

* cited by examiner

*Primary Examiner*—David R Sample
*Assistant Examiner*—Lawrence D Ferguson
(74) *Attorney, Agent, or Firm*—Westerman, Hattori, Daniels & Adrian, LLP

(57) ABSTRACT

A transparent conductive multilayer body of the present invention is characterized by having: a transparent film base; an $SiO_x$ film (x is no less than 1.5 and less than 2) which is provided on one surface of the above described film base in accordance with a dry process, and has a thickness of 1 nm to 30 nm and a relative index of refraction of 1.6 to 1.9; an $SiO_2$ film which is provided on the above described $SiO_x$ film and has a thickness of 10 nm to 50 nm; and a transparent conductive thin film which is provided on the above described $SiO_2$ film and has a thickness of 20 nm to 35 nm.

7 Claims, 5 Drawing Sheets

F I G. 1
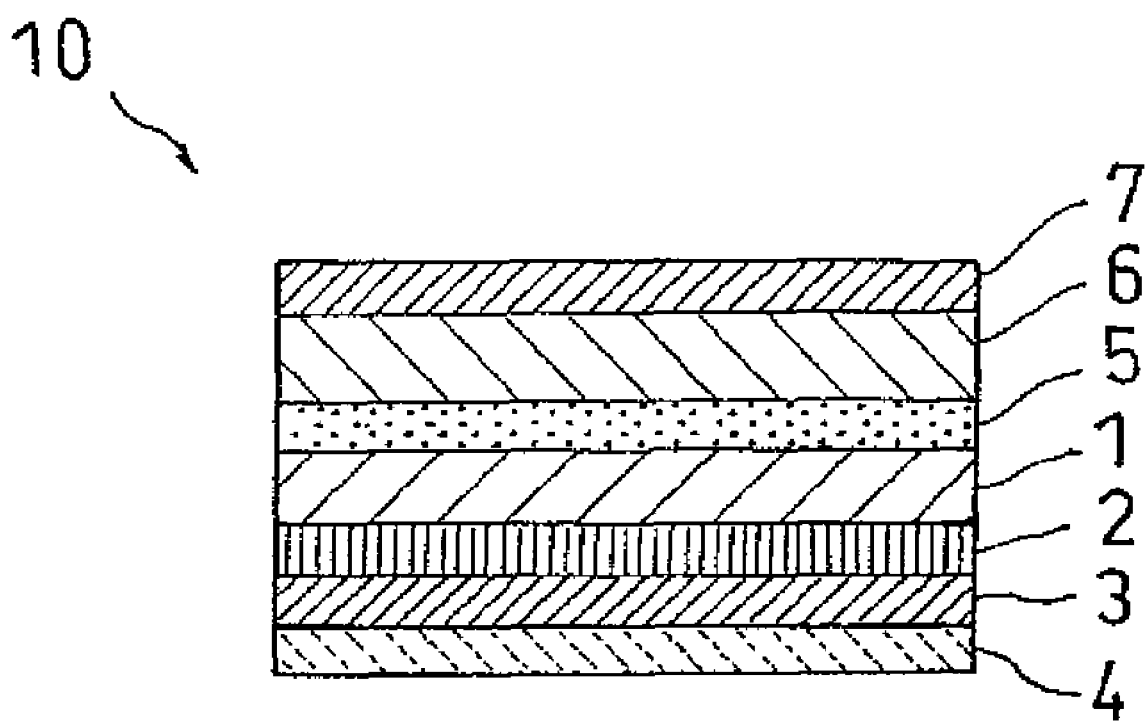

TRANSPARENT CONDUCTIVE MULTILAYER BODY

FIELD OF THE INVENTION

The present invention relates to a transparent conductive multilayer body which is transparent to the visible light range and has a conductive thin film on a film base, as well as a touch panel having the same. A transparent conductive multilayer body of the present invention is used for transparent electrodes in display systems such as liquid crystal displays and electroluminescence displays, as well as in touch panels, in addition to antistatic and electromagnetic wave blocking transparent articles.

BACKGROUND OF THE INVENTION

Touch panels may include optical systems, ultrasonic systems, capacitance systems, resistive systems and the like, depending on the method for detecting locations. From among these, resistive systems have a simple structure, and thus, are excellent in cost efficiency, and have been spreading rapidly in recent years. Resistive system touch panels are used for display panels of, for example, automated teller machines (ATM's) in banks and ticket dispensing machines in transportation facilities.

In the touch panel of such resistive systems, a transparent conductive multilayer body and glass with a transparent conductive thin film are placed so as to face each other with a spacer in between, providing a structure where a current flows through the transparent conductive multilayer body, so that the voltage in the glass with a transparent conductive thin film can be measured. When the transparent conductive multilayer body is made to make contact with the glass with a transparent conductive thin film through pressing operation with a finger, a pen or the like, a current passes through this contact portion, and thereby, the location of this contact portion is detected.

In recent years, the market for touch panels mounted in smart phones, PDA's (personal digital assistants), games and the like has been expanding, and reduction in the size of the frame of touch panels has been progressing. As a result, further increase in the durability against input by pen has become required in the vicinity of the peripheral portions of the touch panels.

A touch panel having a transparent conductive film where an anchor layer formed of a resin containing at least microscopic particles of which the average particle diameter is 1 nm to 30 nm, as well as an average coarseness Ra of 4 nm to 20 nm along the center line, an $SiO_x$ layer and a transparent conductive layer are provided on at least one surface of a transparent base film, for example, is disclosed as a touch panel as that described above (see Japanese Unexamined Patent Publication No. 2002-117724). In this configuration, however, a problem arises, such that the electrical resistance value on the surface of the transparent conductive layer changes and reliability is lacking.

In addition, a touch panel having a transparent conductive film where a base, an anchor layer for securing a conductive layer and a conductive layer are sequentially layered, for example, is disclosed as a touch panel as that described above (see Japanese Unexamined Patent Publication No. 2003-320609). This Japanese Unexamined Patent Publication No. 2003-320609 also describes that the anchor layer may be a silica layer formed in accordance with a plasma CVD method. In the invention described in Japanese Unexamined Patent Publication No. 2003-320609, however, durability against input by pen in the peripheral portions of the touch panel is not taken into consideration, though it is described that a touch panel for input by pen is sufficiently durable against application of pressure in a large sliding movement, and thus, a problem arises, such that durability against input by pen in the peripheral portions is inferior.

SUMMARY OF THE INVENTION

The present invention is provided in view of the above described problems, and an object thereof is to provide a transparent conductive multilayer body which is excellent in the durability against input by pen in the vicinity of the peripheral portions and prevents change in the electrical resistance on the surface of the transparent conductive layer, and thus, is very reliable, as well as a touch panel having the same.

The present inventors diligently researched transparent conductive multilayer bodies and touch panels having the same in order to solve the above described problems with the prior art. As a result, they found that the above described object can be achieved by adopting the below described configuration, and completed the present invention.

That is to say, a transparent conductive multilayer body according to the present invention is characterized by having: a transparent film base; an $SiO_x$ film (x is no less than 1.5 and less than 2) which is provided on one surface of the above described film base in accordance with a dry process, and has a thickness of 1 nm to 30 nm and a relative index of refraction of 1.6 to 1.9; an $SiO_2$ film which is provided on the above described $SiO_x$ film and has a thickness of 10 nm to 50 nm; and a transparent conductive thin film which is provided on the above described $SiO_2$ film and has a thickness of 20 nm to 35 nm, in order to achieve the above described object.

It is preferable in the above described transparent conductive multilayer body for a resin layer to be provided on at least one surface of the above described film base.

In addition, it is preferable in the above described transparent conductive multilayer body for a transparent substrate to be bonded to the surface on the opposite side of the above described film base with a transparent pressure-sensitive adhesive layer in between.

In addition, it is preferable in the above described transparent conductive multilayer body for the above described conductive thin film to be made of crystalline indium tin oxide having a crystal grain diameter of no greater than 200 nm and a crystal content which exceeds 50%.

In addition, it is preferable in the above described transparent conductive multilayer body for the modulus of elasticity on the side on which the above described conductive thin film is layered to be no less than 8 GPa.

In addition, it is preferable in the above described transparent conductive multilayer body for the hardness on the side on which the above described conductive thin film is layered to be no less than 2 GPa.

A touch panel according to the present invention is characterized by having a transparent conductive multilayer body as described above, in order to achieve the above described object.

The present invention provides the means described above which have the effects described below.

That is to say, a transparent conductive multilayer body of the present invention has a structure where an $SiO_x$ film, an $SiO_2$ film and a transparent conductive thin film are sequentially layered on a film base, and in addition, the relative index of refraction of the $SiO_x$ film is within a range of 1.6 to 1.9, and therefore, the durability against input by pen can be increased in the vicinity of the peripheral portions of, for example, a touch panel, in comparison with the prior art, in the case where the transparent conductive multilayer body is applied to the touch panel.

In addition, an $SiO_x$ film is provided between the film base and the $SiO_2$ film, and thereby, the ratio of change in the electrical resistance on the surface of the conductive thin film can be prevented, so that a transparent conductive multilayer body having excellent stability is gained.

Furthermore, the thickness of the $SiO_x$ film is within a range from 1 nm to 30 nm, and thereby, it becomes possible to stably fabricate an $SiO_x$ film as a continuous coating film, while reducing the occurrences of undulation and curling, even under conditions of high temperature and high humidity, and as a result, change in the reflection properties and the hue of transmitted light can be prevented. Furthermore, the $SiO_x$ film is formed in accordance with a dry process, and therefore, moisture can be prevented from entering into the film base, and resistance to humidity and resistance to heat become excellent, as compared to a case where the $SiO_x$ film is formed in accordance with a wet method, by applying, for example, a polysiloxane based thermosetting resin or silica sol. As a result, the occurrence of undulation and curling can further be prevented, as compared to the prior art. In addition, the thickness of the $SiO_2$ film is within a range from 10 nm to 50 nm, and thereby, it becomes possible to stably fabricate an $SiO_2$ film as a continuous coating film, while increasing the resistance against scratching and transparency and preventing the occurrence of cracking. Furthermore, the thickness of the conductive thin film is within a range from 20 nm to 35 nm, and therefore, the electrical resistance on the surface can be reduced, and stable formation of the conductive thin film as a continuous coating film can be made possible, and reduction in the transparency can be prevented.

BRIEF DESCRIPTION OF THE DRAWINGS

Additional objects of the present invention, and characteristics and superior points thereof will be sufficiently understood on the basis of the following description. Advantageous effects of the present invention will also be apparent from the following description which refers to the attached drawings.

FIG. 1 is a schematic cross sectional diagram showing a transparent conductive multilayer body according to one embodiment of the present invention;

DESCRIPTION OF THE EMBODIMENTS

Figure 2:
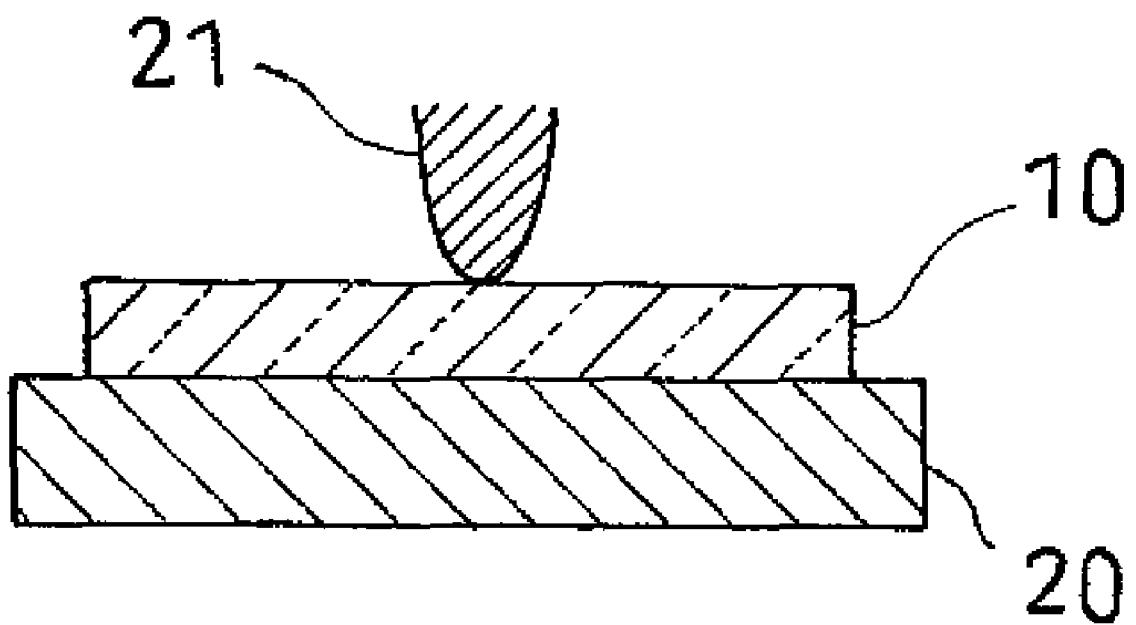
FIG. 2 is a diagram illustrating a method for measuring the hardness and modulus of elasticity of the above described transparent conductive multilayer body on the conductive thin film side.

The embodiments of the present invention are described in the following in reference to the drawings. Here, portions which are unnecessary for the description are omitted, and some portions are illustrated in an enlarged or shrunken diagram, in order to make the description easier.

FIG. 1 is a schematic cross sectional diagram showing an example of a transparent conductive multilayer body according to the present embodiment. That is to say, a transparent conductive multilayer body 10 has a structure where an $SiO_x$ film 2, an $SiO_2$ film 3 and a transparent conductive thin film 4 are sequentially layered on one surface of a transparent film base 1, and a transparent substrate 6 is bonded to the other surface with a transparent pressure-sensitive adhesive layer 5 in between. By providing this structure, durability against input by pen can be increased, as compared to conventional transparent conductive multilayer bodies having a structure where, for example, an ITO film is layered on a film base, and an $SiO_2$ film and an ITO film are sequentially layered on a film base.

The above described film base 1 is not particularly limited, and a variety of plastic films which are transparent can be used. As the material for these, a polyester based resin, an acetate based resin, a polyether sulfone based resin, a polycarbonate based resin, a polyamide based resin, a polyimide based resin, a polyolefin based resin, a (meth)acryl based resin, a polyvinyl chloride based resin, a polyvinylidene chloride based resin, a polystyrene based resin, a polyvinyl alcohol based resin, a polyallylate based resin, a polyphenylene sulfide based resin or the like can be cited as examples. From among these, a polyester based resin, a polycarbonate based resin and a polyolefin based resin are particularly preferable.

Moreover, as is described in Japanese Patent Laid-Open Publication No. 2001-343529 (WO 01/37007), polymer films, for example, resin compositions including (A) thermoplastic resins having substituted and/or non-substituted imide group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer.

It is preferable for the thickness of the above described film base 1 to be within a range from 2 μm to 200 μm, and it is more preferable for it to be within a range from 2 μm to 100 μm. In the case where the thickness of film base 1 is less than 2 μm, the mechanical strength of film base 1 becomes insufficient, and it sometimes becomes difficult to carry out an operation for sequentially forming $SiO_x$ film 2, $SiO_2$ film 3, conductive thin film 4 and pressure-sensitive adhesive layer 5 on this film base 1 in roll form. Meanwhile, in the case where the thickness exceeds 200 μm, the resistance against scratching of conductive thin film 4 and the properties of hit points on a touch panel sometimes cannot be enhanced, due to the cushioning effects of pressure-sensitive adhesive layer 5.

An etching process or an undercoating process, such as sputtering, corona discharge, firing, irradiation with ultraviolet rays, irradiation with electron beams, chemical conversion and oxidation, may be carried out on the surface of the above described film base 1, so that the adhesiveness of $SiO_x$ film 2 which is provided on top of this to the above described film base 1 increases. In addition, dust may be removed or the surface cleaned through washing with a solvent or washing with ultrasonic waves if necessary before the provision of $SiO_x$ film 2.

The above described $SiO_x$ film 2 (x is no less than 1.5 and less than 2) is a layer that is formed in accordance with a dry process. As the dry process, a technique such as vacuum vapor deposition, sputtering or ion plating can be adopted. In the case where an $SiO_x$ film is formed in accordance with a wet method where a polysiloxane based thermosetting resin or a silica sol is applied, it is difficult to prevent moisture from entering film base 1, resistance to moisture and heat becomes insufficient and the occurrences of undulation and curling cannot be lowered in an environment of high temperature and high humidity, even though the thickness of the SiO$_x$ film is within the below described range.

The above described SiO$_x$ film 2 (x is no less than 1.5 and less than 2) is provided on top of film base 1 because sufficient adhesiveness cannot be gained if only SiO$_2$ film 3 is provided directly on film base 1 as an anchor layer in the case where a polyethylene terephthalate film is used as this film base 1. Therefore, SiO$_x$ film 2 is provided between film base 1 and SiO$_2$ film 3, so that this SiO$_x$ film 2 can be used as a binder securing sufficient adhesiveness. In addition, SiO$_2$ is a material having a low index of refraction, and therefore, the reflectance can be lowered, and consequently, high transmissivity of light can be gained. As a result, SiO$_x$ film 2 is particularly effective as an undercoat layer for the conductive thin film.

The thickness of the above described SiO$_x$ film 2 is 1 nm to 30 nm, and preferably in a range from 1 nm to 15 nm. In the case where the thickness is less than 1 nm, it tends to become difficult to stably form the SiO$_x$ film as a continuous coating film. In the case where the thickness exceeds 30 nm, the reflection and hue of the transmitted light may sometimes change when, for example, a test for reliability is carried out in the environment. This is because x becomes closer to 2, so that SiO$_x$ is gradually converted to SiO$_2$ in the test for reliability in the environment, and thereby, the index of refraction of SiO$_x$ film 2 changes within a range of approximately 1.7 to 1.45. SiO$_x$ film 2 is also an optical thin film, and the properties of the optical thin film are determined by the index of refraction of each layer, as well as the thickness thereof, and in the case where the thickness is no greater than 25 nm, it is known for the effects of change in the index of refraction to the optical properties to be small. Here, the above described test for reliability in the environment refers to a test at a high temperature of, for example, 80° C., and a test under high temperature and high humidity, for example, 60° C./90% RH or 85° C./85% RH.

The relative index of refraction of the above described SiO$_x$ film 2 is in a range from 1.6 to 1.9. The relative index of refraction is set within the above described range, and thereby, in the case where transparent conductive multilayer body 10 is applied to, for example, a touch panel, it becomes possible to increase the durability against input by pen in the vicinity of the peripheral portions. In the case where the relative index of refraction is less than 1.6, the above described durability against input by pen is lowered, which is disadvantageous. Meanwhile, it is difficult to fabricate an SiO$_x$ film 2 having a relative index of refraction exceeding 1.9.

The thickness of the above described SiO$_2$ film 3 is 10 nm to 50 nm, and preferably in a range from 10 nm to 30 nm. In the case where the thickness is less than 10 nm, it is difficult for the film to become a continuous coating film, and increase in the resistance against scratching becomes insufficient. In addition, in the case where the thickness exceeds 50 nm, increase in the transparency becomes insufficient, and there is a risk that cracking may occur.

It is preferable for the average surface coarseness of the above described SiO$_x$ film 2 and SiO$_2$ film 3 to be within a range from 0.8 nm to 3.0 nm, respectively. In the case where the average surface coarseness is less than 0.8 nm, the surface unevenness becomes too small, and there is a risk that antiglare properties may lower. In addition, in this case, when conductive thin film 4 is formed so as to have a great thickness, the resistance value on the surface also becomes too low. Meanwhile, in the case where the average surface coarseness exceeds 3.0 nm, the surface unevenness becomes too great, and there is a risk that it may become difficult to gain a stable resistance value on the surface. Here, average surface coarseness means "surface coarseness (Ra)," measured using an AFM (atomic force microscope). Concretely, SPI3800 (made by Seiko Instruments Inc.) is used as the AFM, and the value is measured under conditions where the mode is contact mode, the short probe is made of Si$_3$N$_4$ (spring constant: 0.09 N/m), and the size of the scanned area is 1 μm□.

The material that forms the above described conductive thin film 4 is not particularly limited, and indium oxide which contains tin oxide and tin oxide which contains antimony, for example, are preferably used. Here, it is particularly preferable for conductive thin film 4 to be formed of crystalline indium tin oxide having a crystal grain diameter of no greater than 200 nm, preferably 50 nm to 150 nm, and a crystal content exceeding 50%. As a result, a conductive thin film having excellent durability against input by pen in the vicinity of the peripheral portions can be gained. In the case where a large amount of crystal has a large crystal grain diameter, cracking easily occurs, and the durability against input by pen tends to lower in the vicinity of the peripheral portions. Here, crystal grain diameter is defined as the average value of the maximum diagonal line or diameter of polygonal forms or elliptical forms in each region observed using a transmission electron microscope. The crystal grain diameter can be measured through observation with, for example, FE-TEM (HF-2000, made by Hitachi Ltd., acceleration voltage: 200 kV) or the like.

The thickness of conductive thin film 4 is 20 nm to 35 nm, and preferably within a range from 20 nm to 30 nm. In the case where the thickness is less than 20 nm, the electrical resistance on the surface becomes high and it becomes difficult for the conductive thin film to be a continuous coating film. In addition, in the case where the thickness exceeds 35 nm, the transparency decreases.

In addition, conductive thin film 4 is formed on SiO$_x$ film 2 which is provided on film base 1 with SiO$_2$ film 3 in between and therefore, the ratio of change in the electrical resistance on the surface thereof can be lowered, making the stability excellent in comparison with the prior art.

The method for forming conductive thin film 4 is not particularly limited, and the methods known in the prior art can be adopted. Concretely, a vacuum vapor deposition method, a sputtering method, an ion plating method and the like can be cited as examples. In addition, an appropriate method can be adopted on the basis of the required film thickness.

A transparent substrate 6 is bonded to the other surface of film base 1 on which the above described conductive thin film 4 is formed with a transparent pressure-sensitive adhesive layer 5 in between. This bonding may be carried out by providing the above described pressure-sensitive adhesive layer 5 on the transparent substrate 6 side and bonding the above described film base 1 to this, or conversely, by providing the above described pressure-sensitive adhesive layer 5 on the film base 1 side and pasting transparent substrate 6 to this. In accordance with the latter method, pressure-sensitive adhesive layer 5 can be continuously formed on film base 1 in roll form, which is more advantageous in terms of productivity.

An adhesive material can be used for pressure-sensitive adhesive layer 5 without any particular limitation, as long as it is transparent. Concretely, an appropriate adhesive of which the base polymer is an acryl based polymer, a silicone based polymer, polyester, polyurethane, polyamide, polyvinyl ether, a copolymer of vinyl acetate/vinyl chloride, a denatured polyolefin, an epoxy based polymer, a fluorine based polymer, a rubber based polymer such as a natural rubber or synthetic rubber polymer, for example, can be selected for use. In particular, an acryl based adhesive is preferably used, from the point of view of excellence in optical transparency, appropriate wettability, exhibition of adhesive properties, such as aggregation and bonding, and excellence in resistance to weather and heat.

Some types of adhesives used as the material that forms pressure-sensitive adhesive layer 5 make it possible to increase the anchoring force when an appropriate undercoat agent for adhesion is used. Accordingly, it is preferable to use an undercoat agent for adhesion in the case where such an adhesive is used.

The above described undercoat agent for adhesion is not particularly limited, as long as it can form a layer that increases the anchoring force of the adhesive. Concretely, a coupling agent, such as a silane based coupling agent having a reactive functional group, such as an amino group, a vinyl group, an epoxy group, a mercapto group or a chloro group, and a hydrolyzable alkoxysilyl group within the same molecule, a titanate based coupling agent having a hydrolyzable hydrophilic group including titanium and an organic functional group within the same molecule, and an aluminate based coupling agent having a hydrolyzable hydrophilic group including aluminum and an organic functional group within the same molecule, or a resin having an organic reactive group, such as an epoxy based resin, an isocyanate based resin, a urethane based resin or an ester urethane based resin, for example, can be used. A layer which contains a silane based coupling agent is particularly preferable, from the point of view of ease of handling in the industry.

In addition, the above described pressure-sensitive adhesive layer 5 may contain a cross linking agent, depending on the base polymer. In addition, an appropriate additive, such as a bulking agent, a pigment, a coloring agent or an anti-oxidant made of, for example, natural or synthetic resin, glass fibers or glass beads, metal powder or another inorganic powder, can be mixed with pressure-sensitive adhesive layer 5, if necessary. In addition, pressure-sensitive adhesive layer 5 may contain transparent microscopic particles, so that light dispersing properties can be provided.

Here, as the above described transparent microscopic particles, one or more appropriate types of conductive inorganic microscopic particles of silica, calcium oxide, alumina, titania, zirconia, tin oxide, indium oxide, cadmium oxide or antimony oxide having an average particle diameter of 0.5 μm to 20 μm, and cross linked or non cross linked organic microscopic particles made of an appropriate polymer, such as polymethyl methacrylate or polyurethane, for example, can be used.

The above described pressure-sensitive adhesive layer 5 is usually formed of an adhesive solution having a solid component with a concentration of approximately 10 wt % to 50 wt % where a base polymer or a composition thereof is dissolved or dispersed in a solvent. A solvent appropriate for the type of adhesive used can be selected for use as the above described solvent from among organic solvents, such as toluene and ethyl acetate, as well as water.

This pressure-sensitive adhesive layer 5 has functions of increasing the resistance against scratching of the conductive thin film that is provided on one surface of film base 1 and the hit point properties for a touch panel, that is to say, durability against input by pen using the cushioning effects after transparent substrate 6 has been made to adhere to the pressure-sensitive adhesive layer. It is desirable, from the point of view of providing these functions more effectively, to set the modulus of elasticity of pressure-sensitive adhesive layer 5 within a range from 1 N/cm$^2$ to 100 N/cm$^2$ and the thickness to no less than 1 μm, usually within a range from 5 μm to 100 μm.

In the case where the above described modulus of elasticity is less than 1 N/cm$^2$, pressure-sensitive adhesive layer 5 becomes inelastic, and therefore, easily changes in form when pressure is applied, causing unevenness in film base 1 and then in conducive thin film 4. In addition, it becomes easy for the adhesive to come out from the processed and cut surface, and in addition, the effects of increasing the resistance against scratching of conductive thin film 4 and the hit point properties for a touch panel are reduced. Meanwhile, in the case where the modulus of elasticity exceeds 100 N/cm$^2$, pressure-sensitive adhesive layer 5 becomes hard and cushioning effects cannot be expected, and thus, it tends to become difficult to increase the resistance against scratching of conductive thin film 4 and the durability against input by pen for a touch panel.

In addition, in the case where the thickness of pressure-sensitive adhesive layer 5 is less than 1 μm, cushioning effects cannot be expected, and thus, it tends to become difficult to increase the resistance against scratching of conductive thin film 4 and the durability against input by pen for a touch panel. Meanwhile, in the case where the thickness is too great, the transparency decreases and it becomes difficult to gain good results from the operation for forming pressure-sensitive adhesive layer 5 and bonding transparent substrate 6, and in addition, to gain cost efficiency.

Transparent substrate 6, which is bonded to the conductive thin film, with the above described pressure-sensitive adhesive layer 5 in between, provides excellent mechanical strength to film base 1, and in particular, contributes to the prevention of curling. In the case where flexibility is required even after bonding, transparent substrate 6 is usually made of a plastic film having a thickness of approximately 6 μm to 300 μm. Meanwhile, in the case where flexibility is not particularly required, a glass plate or plastic in film form or in plate form having a thickness of approximately 0.05 mm to 10 mm is usually used. The same materials as those for the above described film base 1 can be cited for the plastic.

In the case where pressure-sensitive adhesive layer 5 is transcribed using the above described separator, it is preferable to use, for example, a polyester film where a transition preventing layer and/or a mold release layer is layered on at least the surface of the polyester film or the like to which pressure-sensitive adhesive layer 5 is made to adhere as the separator.

It is preferable for the total thickness of the above described separator to be no less than 30 μm, and it is more preferable for it to be within a range from 75 μm to 100 μm. This is in order to prevent change in the form (hit mark) of pressure-sensitive adhesive layer 5, which can be expected to be caused by foreign substances and the like that are caught between the layers in the roll in the case where the separator is stored in a rolled state after the formation of pressure-sensitive adhesive layer 5.

The above described transition preventing layer can be formed of a material appropriate for preventing transition of a transition component in the polyester film, in particular, a low molecular weight oligomer component of the polyester. An inorganic material, an organic material or a composite material of these can be used as the material for forming the transition preventing layer. An appropriate thickness can be set for the transition preventing layer within a range from 0.01 μm to 20 μm. The method for forming the transition preventing layer is not particularly limited, and an application method, a spraying method, a spin coating method or an inline coating method, for example, can be used. In addition, a vacuum vapor deposition method, a sputtering method, an ion plating method, a thermal decomposition spray method, a chemical plating method, an electrical plating method or the like can also be used.

As for the above described mold release layer, a layer can be formed of an appropriate peeling agent, such as a silicone based agent, a long chain alkyl based agent, a fluorine based agent or molybdenum sulfide. An appropriate thickness can be set for the mold release layer, taking the effects of mold release into consideration. In general, it is preferable for the thickness to be no greater than 20 μm, it is more preferable for it to be within a range from 0.01 μm to 10 μm, and it is particularly preferable for it to be within a range from 0.1 μm to 5 μm from the viewpoint of handleability such as flexible property.

An ionizing radiation curing resin, such as an acryl based resin, a urethane based resin, a melamine based resin or an epoxy based resin, or a resin where aluminum oxide, silicon dioxide, mica or the like is mixed into such a resin can be used in the above described application method, spray method, spin coating method and inline coating method. In addition, in the case where a vacuum vapor deposition method, a sputtering method, an ion plating method, a thermal decomposition spray method, a chemical plating method or an electrical plating method is used, a metal oxide made of gold, silver, platinum, palladium, copper, aluminum, nickel, chromium, titanium, iron, cobalt, tin or an alloy of these, or another metal compound, made of steel iodide or the like, can be used.

In addition, an antiglare processed layer or a reflection preventing layer may be provided on the external surface (surface on the side opposite to pressure-sensitive adhesive layer 5) of the above described transparent substrate 6 in order to increase the visibility if necessary, or a hard coat layer (resin layer) 7 may be provided in order to protect the external surface. The antiglare processed layer or reflection preventing layer may be provided on hard coat layer 7 that is provided on transparent substrate 6. As for hard coat layer 7, a hard coat film made of a hard resin, such as a melanin based resin, a urethane based resin, an alkyd based resin, an acryl based resin or a silicone based resin, for example, is preferably used.

The material that forms the antiglare processed layer is not particularly limited, and an ionizing radiation curing resin, a thermosetting resin or a thermoplastic resin, for example, can be used. It is preferable for the thickness of the antiglare processed layer to be 0.1 μm to 30 μm. In the case where the thickness is smaller than 0.1 μm, lack of hardness becomes a concern, while in the case where the thickness is greater than 30 μm, cracking sometimes occurs in the antiglare processed layer or the entirety of transparent substrate 6 to which the antiglare processed layer is applied sometimes curls.

The reflection preventing layer can be provided on top of the above described hard coat layer 7. When light hits an object, it transmits to the rear surface of the object after repeatedly reflecting from the interface between the object and the outside, being absorbed into the object and scattering. When a touch panel 15 is mounted on an image display, reflection of light from the interface between the air and transparent substrate 6 or hard coat layer 7 can be cited as one factor in lowering the visibility of the image. As a method for reducing reflection from the surface, a thin film of which the thickness and index of refraction are strictly controlled can be layered on the surface of hard coat layer 7, so that the phase of incident light and the inverted phase of the reflected light offset each other using the effects of light interference, and thereby, a reflection preventing function can be provided.

When the antireflection layer is designed based on interference of light, the interference effect can be enhanced by a method of increasing the difference between the refractive indexes of the antireflection layer and the hard-coating layer 7. A laminate of two to five thin optical films (each with strictly controlled thickness and refractive index) may be stacked on a substrate to form an antireflection multilayer. In such a case, components of different refractive indexes are generally used to form a plurality of layers with a certain thickness. Thus, the antireflection layer can be optically designed at a higher degree of freedom, the antireflection effect can be enhanced, and it may be possible to make the spectral reflection characteristics flat in the visible light range. Since each layer of the thin optical film must be precise in thickness, a dry process such as vacuum deposition, sputtering, and CVD is generally used to form each layer.

The antireflection layer material may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 1.8), which is formed on the hard-coating layer, and a low-refractive-index silicon oxide layer (refractive index: about 1.45), which is formed on the titanium oxide layer. Also preferred is a four-layer laminate comprising the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

The antireflection effect can also be produced by stacking a thin monolayer optical film on the transparent substrate 6 or the hard-coating layer 7. In the design of a single antireflection layer, the difference between the refractive indexes of the antireflection layer and the hard-coating layer 7 should be large for the maximum antireflection function. Concerning the thickness (d) of the antireflection layer, the refractive index (n) and the wavelength (λ) of incident light, the relation nd=λ/4 is established. If the antireflection layer is a low-refractive-index layer having a refractive index lower than that of the film substrate 1, its reflectance can be minimum under the conditions that the relation should be established. For example, if the refractive index of the antireflection layer is 1.45, the antireflection layer 5 with a thickness of 95 nm can have a minimum reflectance at a wavelength of 550 nm with respect to an incident beam of visible light.

The antireflection function should be produced in the visible light wavelength range of 380 to 780 nm, and the visibility is particularly high in the wavelength range of 450 to 650 nm. The layer is generally designed to have a minimum reflectance at the center wavelength 550 nm of the range.

In the design of a single antireflection layer, its thickness accuracy may be less strict than that of the antireflection multilayer and may be in the range of the design thickness ±10%. In a case where the design thickness is 95 nm, for example, the layer with a thickness in the range of 86 nm to 105 nm can be used without problems. Thus, a single antireflection layer is generally formed using a wet process such as fountain coating, die coating, spin coating, spray coating, gravure coating, roll coating, and bar coating.

As for the material that forms hard coat layer 7, a hard coating film made of, for example, a hard resin, such as a melanin based resin, a urethane based resin, an alkyd based resin, an acryl based resin or a silicone based resin, is preferably used. In addition, it is preferable for the thickness of hard coat layer 7 to be 0.1 μm to 30 μm. In the case where the thickness is less than 0.1 μm, hardness sometimes lacks. In addition, in the case where the thickness exceeds 30 μm, cracking sometimes occurs in hard coat layer 7 and the entirety of transparent substrate 6 curls.

Here, in some cases, an annealing process may be carried out within a range from 100° C. to 150° C. at the time of fabrication of transparent conductive multilayer body 10 shown in FIG. 1 or the touch panel, if necessary. Therefore, it is preferable for transparent conductive multilayer bodies 10 to be resistant to heat of no less than 100° C., more preferably no less than 150° C.

It is preferable for the hardness on the conductive thin film side of transparent conductive multilayer body 10 to be no less than 2 GPa, more preferably no less than 3 GPa, in terms of the properties on the side where conductive thin film 4 and the like are layered. In addition, it is preferable for the modulus of elasticity on the conductive thin film 4 side to be no less than 8 GPa, particularly preferably no less than 10 GPa. Because of these properties, no cracking is caused in conductive thin film 4, and there are no problems such as lowering of the electrical resistance value, even when transparent conductive multilayer body 10 is warped, and thus, the transparent conductive multilayer body is appropriate for use as a substrate, for example as a touch panel in the field of optoelectronics, because of the excellent flexing properties. Here, it is preferable for the upper limit of the hardness on the above described conductive thin film 4 side to be no higher than 5 GPa, more preferably no higher than 4 GPa, from the point of view of resistance to cracking, and likewise, it is preferable for the modulus of elasticity on the above described conductive thin film 4 side to be no higher than 20 GPa, more preferably no higher than 16 GPa, from the point of view of resistance to cracking.

It is possible to measure the hardness and the modulus of elasticity on the above described conductive thin film 4 side using, for example, a scanning type probe microscope (JSPM-4200, made by JOEL Ltd. (Japan Electron Optics Laboratory Co., Ltd.)) in an indentation test (testing by inserting indenter) (see FIG. 2). When measuring the hardness of a thin film, it is generally necessary for the depth to which an indenter is inserted to be within approximately one tenth of the film thickness.

In an indentation test, the object to be tested (that is to say, the conductive thin film 4 side of transparent conductive multilayer body 10) is secured to a sample support 20, and an indenter 21 is inserted by applying a load into a portion at approximately the center of the object being tested in the above described state, so that an indentation curve (load-insertion depth curve) is gained. The hardness H of the object being tested is found using the following formula (1), from the ratio of the maximum load Pmax at this time to the projected area A of contact between indenter 21 and the object being tested. In addition, the complex modulus of elasticity Er of the object being tested is found using the following formula (2), from the initial gradient S of the load removing curve of the indentation curve. Furthermore, the Young's modulus Es of the object being tested is found using the following formula (3), from the Young's modulus Ei of indenter 21, the Poisson's ratio vi of indenter 21 and the Poisson's ratio vs of the object being tested.

Here, β is a constant in the following formula (2). In addition, the indenter 21 is diamond, and the Young's modulus Ei thereof is 1140 GPa and the Poisson's ratio is 0.07.

$$H = P\text{max}/A \quad (1)$$

$$S = (2/\sqrt{\pi}) \cdot Er \cdot \beta \cdot \sqrt{A} \quad (2)$$

$$Er = 1/\{(1-vs2)/Es + (1-vi2)/Ei\} \quad (3)$$

Here, the Poisson's ratio vs of the conductive thin film which is the object being tested is unknown, and therefore, the above described complex modulus of elasticity Er is assumed to be the modulus of elasticity in the present invention. The details of measurement are described in, for example, W. C. Oliver and G. M. Phar, J. Meter. Res., Vol. 7, No. 6, June 1992, Handbook of Micro/Nanotribology and the like, and measurement can be carried out in accordance with any well-known method.

Figure 3:
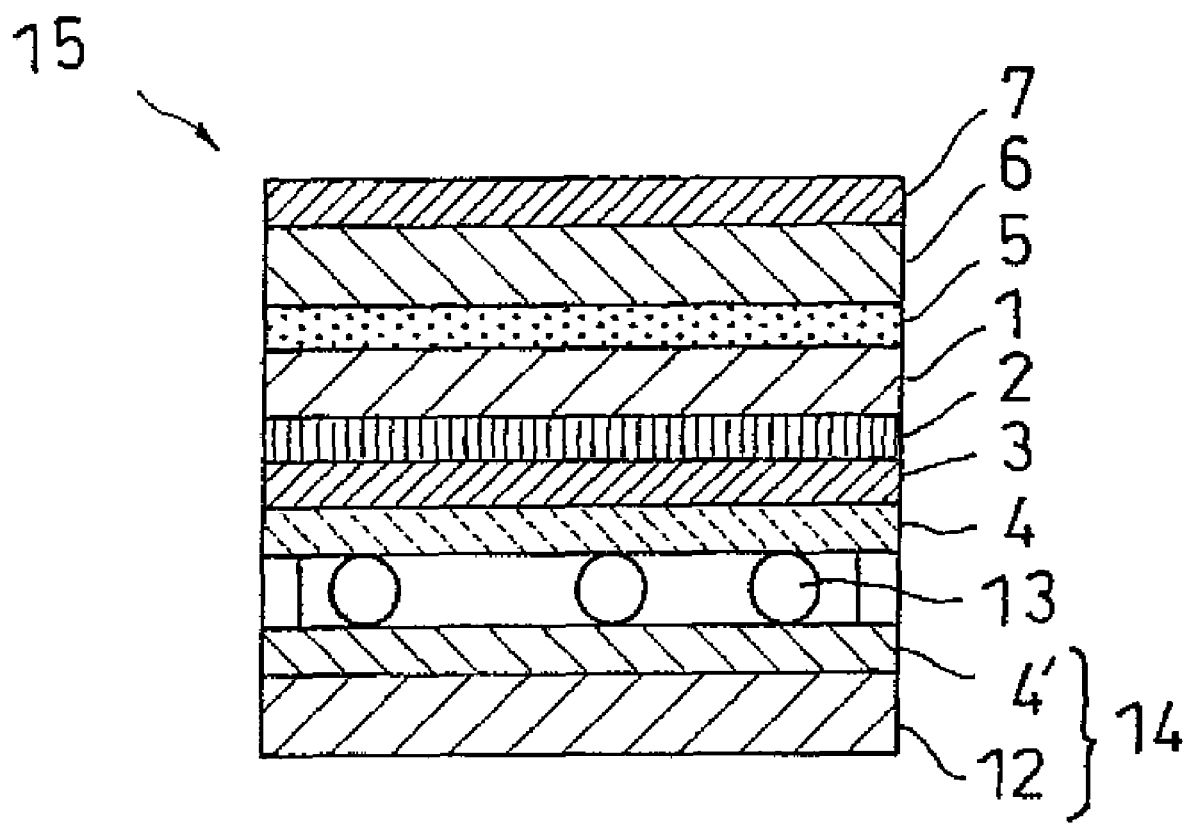
FIG. 3 is a schematic cross sectional diagram showing a touch panel according to one embodiment of the present invention.

Next, the touch panel according to the present embodiment is described. FIG. 3 is a schematic cross sectional diagram schematically showing the touch panel according to the present embodiment. As shown in this figure, a touch panel 15 has a structure where a transparent conductive multilayer body 10 as that described above and a lower side substrate 14 are placed in such a manner as to face each other with spacers 13 in between.

Lower side substrate 14 has a structure where another conductive thin film 4' is layered on another transparent substrate 12. Here, the present invention is not limited to this, and it is also possible to use transparent conductive multilayer body 10, for example, as lower side substrate 14. As for the material that forms another transparent substrate 12, basically the same type of substrate as transparent substrate 6 may be used. In addition, the thickness thereof can be made the same as that of transparent substrate 6. As for the material that forms conductive thin film 4', basically the same material as that for conductive thin film 4 may be used. In addition, the thickness thereof can be made the same as that of conductive thin film 4.

Spacers 13 are not particularly limited, as long as they have insulating properties, and various types that are well known in the art can be adopted. The manufacturing method, the size, the location and the number of spacers 13 are also not particularly limited. In addition, as the form of spacers 13, any form that is well known in the prior art, for example approximately spherical form or polygonal form, can be adopted.

This touch panel 15 functions as a transparent switch substrate which becomes of an electrically ON state, where conductive thin films 4 and 5' make contact with each other, when a point is pressed or hit on the transparent conductive multilayer body 10 side using an input pen so as to counterwork the elasticity of spacers 13, and returns to the original OFF state when the pressure is released. At this time, the above described function can be stably maintained over a long period of time in touch panel 15, where the above described conductive film 4 has excellent resistance against scratching, durability against input by pen and the like.

In the following, the present invention is described in detail using examples, but the present invention is not limited to the following examples, as long as it does not deviate from the gist thereof. In addition, in the respective examples, parts are always a weight reference unless otherwise stated.

EXAMPLE 1

[Formation of Conductive Thin Film]

An $SiO_x$ film (relative index of refraction: 1.80; thickness: 15 nm) was formed on one surface of a film base made of a polyethylene terephthalate film (hereinafter referred to as PET film) having a thickness of 25 μm in accordance with a vacuum vapor deposition method.

Next, an $SiO_2$ film (relative index of refraction: 1.46; thickness: 30 nm) was formed on the $SiO_x$ film in accordance with a vacuum vapor deposition method. Next, an ITO film (conductive thin film having a relative index of refraction of 2.00) having a thickness of 25 nm was formed on the $SiO_2$ film in accordance with a reactive sputtering method using a sintered material having 95 wt % of indium oxide and 5 wt % of tin monoxide in an atmosphere of 80% argon gas and 20% oxygen gas under $4\times10^{-3}$ Torr. In addition, the ITO film was crystallized through heat treatment at 150° C. for one hour.

[Formation of Hard Coat Layer]

5 parts of hydroxycyclohexyl phenyl ketone (Irgacure 184, made by Ciba Specialty Chemicals K.K.) as a photo polymerization initiator were added to 100 parts of an acryl-urethane based resin (Unidic 17-806, made by Dainippon Ink and Chemicals, Incorporated), and the resulting substance was diluted to a concentration of 50 wt %, and thus, a toluene solution was prepared as a material for forming a hard coat layer.

This material for forming a hard coat layer was applied to one surface of a transparent substrate made of a PET film having a thickness of 125 μm and dried at 100° C. for three minutes. Immediately afterwards, ultraviolet rays were radiated from two ozone type high pressure mercury lamps (15 cm light condensing type; energy density: 80 W/cm²), and thus, a hard coat layer having a thickness of 5 μm was formed.

[Fabrication of Transparent Conductive Multilayer Body]

Next, a transparent acryl based adhesive layer having a thickness of approximately 20 μm and a modulus of elasticity of $1\times10^6$ dyn/cm² (10 N/cm²) was formed on the surface of the above described transparent substrate on the side opposite to the surface where the hard coat layer was formed. One part of an isocyanate based cross linking agent was mixed into 100 parts of an acryl based copolymer where the weight ratio of butyl acrylate, acrylic acid and vinyl acetate was 100:2:5, and the resulting substance was used as a composition for the pressure-sensitive adhesive layer. Furthermore, the film base and the transparent substrate were bonded with a transparent pressure-sensitive adhesive layer, a transparent conductive multilayer body according to the present example was fabricated.

EXAMPLE 2

In the present example, a transparent conductive multilayer body was fabricated in the same manner as in Example 1, except that the relative index of refraction of the $SiO_x$ film was 1.75.

EXAMPLE 3

In the present example, a transparent conductive multilayer body was fabricated in the same manner as in Example 1, except that the relative index of refraction of the $SiO_x$ film was 1.70.

EXAMPLE 4

In the present example, a transparent conductive multilayer body was fabricated in the same manner as in Example 1, except that the relative index of refraction of the $SiO_x$ film was 1.85.

EXAMPLE 5

In the present example, a transparent conductive multilayer body was fabricated in the same manner as in Example 1, except that the thickness of the $SiO_x$ film was 40 nm and the relative index of refraction was 1.85.

COMPARATIVE EXAMPLE 1

In the present comparative example, a transparent conductive multilayer body was fabricated in the same manner as in Example 1, except that the relative index of refraction of the $SiO_x$ film was 1.55.

COMPARATIVE EXAMPLE 2

In the present comparative example, a transparent conductive multilayer body was fabricated in the same manner as in Example 1, except that no $SiO_2$ film was formed.

COMPARATIVE EXAMPLE 3

In the present comparative example, a transparent conductive multilayer body was fabricated in the same manner as in Example 1, except that no $SiO_x$ film was formed.

COMPARATIVE EXAMPLE 4

In the present comparative example, a transparent conductive multilayer body was fabricated in the same manner as in Example 1, except that neither an $SiO_x$ film nor an $SiO_2$ film was formed.

COMPARATIVE EXAMPLE 5

In the present comparative example, a dielectric thin film was formed on a PET film instead of an $SiO_x$ film, and a wet $SiO_2$ film was formed on the dielectric thin film instead of an $SiO_2$ film. The details are as follows. That is to say, a hard coat film (dielectric thin film having a thickness of 200 nm and a relative index of refraction n=1.54) was formed of a thermosetting resin where melamine resin:alkyd resin:organic silane condensate=2:2:1 (weight ratio).

Next, a wet $SiO_2$ film was formed on the dielectric thin film in accordance with a silica coating method. That is to say, a silica sol ("Colcoat P," made by Colcoat Co., Ltd.) diluted with ethanol so that the concentration of the solid become 2% was applied and dried at 150° C. for two minutes so as to be cured, and thus, a wet $SiO_2$ film (relative index of refraction: 1.46) having a thickness of 30 nm was formed. Subsequently, the same process as that in Example 1 was carried out, so that a transparent conductive multilayer body was fabricated.

(Fabrication of Touch Panel)

Each of the transparent conductive multilayer bodies gained in the examples and comparative examples was used as one panel, and a transparent conductive glass plate on which an ITO thin film having a thickness of 30 nm was formed in accordance with the same method as that described above was used as the other panel (lower side substrate), and these two panels were placed so as to face each other in such a manner that the ITO thin films face each other with spacers having a thickness of 10 μm in between, and thus, a touch panel was fabricated as a switch structure. Here, silver electrodes were formed on the respective ITO thin films on the two panels in advance so as to be perpendicular to each other prior to the above described placing of the panels in such a manner that the panels face each other.

(Index of Refraction)

An Abbe's refractometer made by Atago Co., Ltd. was used to measure the index of refraction of the film base, the $SiO_x$ film, the $SiO_2$ film, the ITO films and the like in accordance with a standard measuring method where a certain value is indicated in the refractometer when light for measurement enters into each type of surface to be measured.

(Thickness of Each Layer)

The thickness of the film base, the hard coat layer, the pressure-sensitive adhesive layer and the like, which were no less than 1 μm, were measured using a micro gauge type thickness meter made by Mitutoyo Corporation. In the case of layers of which the thickness is difficult to measure directly, such as the hard coat layer and the pressure-sensitive adhesive layer, the total thickness of a base on which each layer was provided was measured, and the film thickness of each layer was calculated by subtracting the thickness of the film base.

An MCPD2000 (trade name), which is an instant multiple light measuring system made by Otsuka Electronics Co., Ltd., was used to calculate the thickness of the $SiO_x$ film, the $SiO_2$ film, the ITO films and the like on the basis of waveforms gained from interference spectra. The thickness of each film is shown in the following Table 1.

(Hardness and Modulus of Elasticity on Conductive Thin Film Side)

The hardness and the modulus of elasticity on the conductive thin film side were measured in accordance with the method described in detail in the present specification, through an indentation test. That is to say, as shown in the above described FIG. 2, a standard sample (melted silica) was secured to a sample support and an indenter was inserted in a portion at approximately the center of the standard sample in this state through application of a load in the vertical direction. The relationship between the maximum depth of insertion hc and the projected area of contact A when the indenter made contact with the standard sample is shown in the following formula.

$$A = 24.5\ hc^2 = C_0 hc^2 + C_1 hc + C_2 hc^{1/2} + C_3 hc^{1/4} + C_4 hc^{1/8} + C_5 hc^{1/10}$$

Furthermore, $C_0$ to $C_5$ were calculated using the above described formulas (1) to (3). At the time of calculation, each indentation (insertion of indenter) was carried out for three seconds under conditions where each of six loads: 20 N, 50 N, 80 N, 100 N, 150 N and 200 N, was applied to the indenter in the vertical direction, and measurement was carried out five times for each sample and the average value was found. In each measurement, a sufficient distance was kept between the measured portions so that measurement would not be affected by the pressure mark. In addition, calculation was carried out so that hardness H became 10 GPa and the modulus of elasticity Er became 70 GPa for each load.

Next, the transparent conductive multilayer bodies gained in the respective examples and comparative examples were used as objects to be tested, and the hardness and the modulus of elasticity were measured for each object to be tested. The object to be tested was secured to the sample support so that the conductive thin film (ITO thin film) faced upward. In this secured state, one indentation (insertion of an indenter) was carried out for three seconds in a portion at approximately the center on the conductive thin film side through application of a load of 20 μN on the indenter in the vertical direction, and measurement was carried out five times for each sample and the average value was found.

(Electrical Resistance on Surface and Ratio of Change Therein)

A two terminal method was used to measure the electrical resistance $R_0$ (Ω/□) on the surface of the ITO film in each touch panel. In addition, the electrical resistance R on the surface of the ITO film was also measured, after the touch panel was left in an atmosphere of 60° C. and 95% RH for 500 hours, and thus, the ratio of change ($R/R_0$) in the electrical resistance on the surface of the ITO film was found and the reliability was evaluated.

(Transmissivity for Light)

A spectrometer UV-240, made by Shimadzu Corporation, was used to measure the transmissivity for visible light having a wavelength of 550 nm.

(Durability against Input by Pen in Vicinity of Peripheral Portions)

Figure 4:
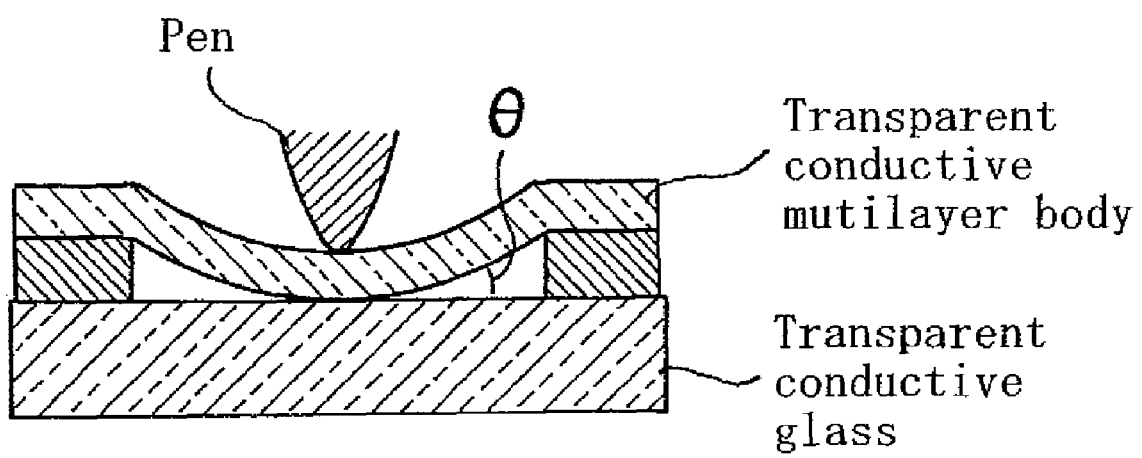
FIG. 4 is a schematic cross sectional diagram illustrating a test for the durability against input by pen of a touch panel according to an example of the present invention.

As shown in FIG. 4, a pen made of polyacetal (tip of pen R: 0.8 mm) was used and slid over each touch panel, and after that, the linearity of each sliding was measured, and thus, the durability against input by pen was evaluated. The pen was slid within a certain range at a distance of 2.0 mm to 2.3 mm from the peripheral portions of the touch panel in a region on the transparent conductive multilayer body side. In addition, the conditions for sliding were such that the load was 250 g, the number of slides was 50000 times, the angle θ of the sliding pen was 4.0 degrees and the gap within the touch panel was 150 μm.

Figure 5:
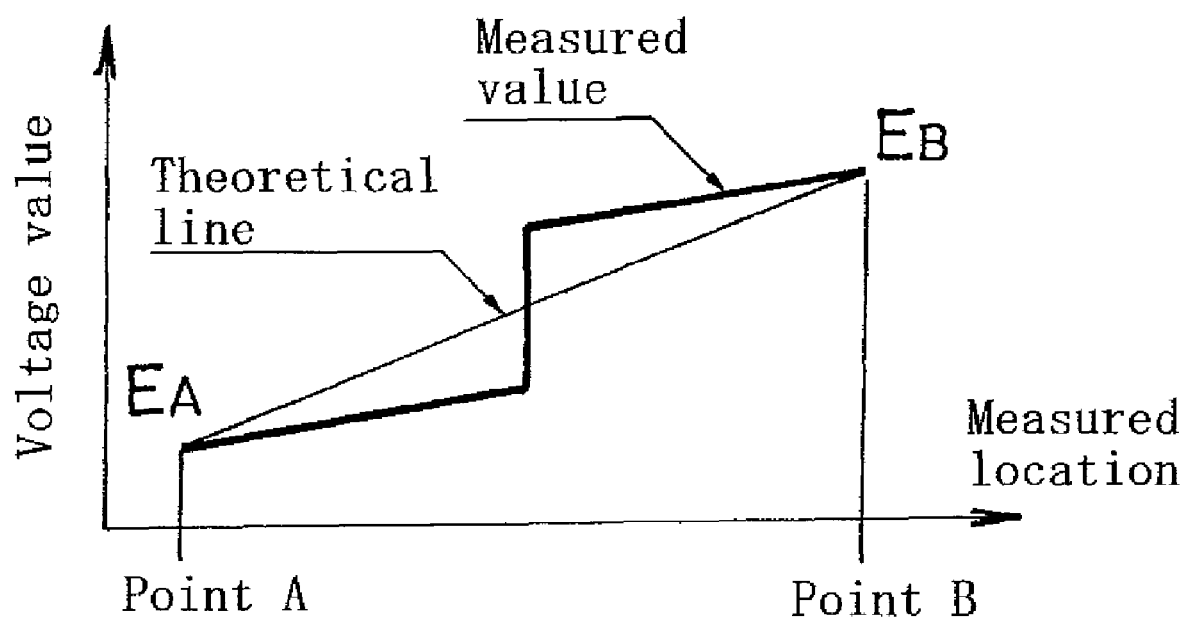
FIG. 5 is a graph showing the relationship between the voltage value and the measured location on the touch panel that is gained in Example 1.

The linearity was measured as follows. That is to say, the linearity was gained through calculation using the following formula, where the output voltage of point A where measurement commenced was $E_A$, the output voltage of point B where measurement was completed was $E_B$, the output voltage of the measured point was $E_X$ and the theoretical value was $E_{XX}$ when a voltage of 5 V was applied to the transparent conductive multilayer body after sliding the pen over each touch panel. FIG. 5 is a graph showing the relationship between the voltage value and the measured point in the touch panel gained in Example 1. The solid line in this figure indicates the measured values and the broken line indicates the theoretical values. The durability against input by pen was evaluated from the gained value for the linearity. The results are shown in the following Table 1.

$$E_{XX}(\text{theoretical value}) = (E_B - E_A)/(B - A) + E_A$$

$$\text{linearity}(\%) = \{(E_{XX} - E_X)/(E_B - E_A)\} \times 100$$

(Durability against Input by Pen through Application of High Load)

The durability against input by pen through application of a high load was evaluated in the same manner as the above described durability against input by pen, except that the conditions for sliding were such that the load was 3 kg, the number of slides was 5000 times, the angle θ of the sliding pen was 1.0 degree and the gap within the touch panel was 100 μm.

(Results)

As is clear from the following Table 1, the durability against input by pen in the vicinity of the peripheral portions and the durability against input by pen under application of a high load are excellent and the ratio of change in the electrical resistance on the surface can be made low, and thus, it can be confirmed that the touch panels according to Examples 1 to 5 have excellent reliability. In addition, the transmissivity of all of the touch panels is approximately 90%, which is a good value. Meanwhile, none of the touch panels according to Comparative Examples 1 to 3 simultaneously satisfy all of the requirements in terms of the electrical resistance on the surface, the ratio of change in the electrical resistance on the surface, the transmissivity, durability against input by pen in the vicinity of the peripheral portions and durability against input by pen under application of a high load, though some may be excellent.

TABLE 1

| | SiO$_x$ film | | SiO$_2$ film | | | Modulus of |
|---|---|---|---|---|---|---|
| | Thickness (nm) | Index of refraction | Thickness (nm) | Index of refraction | Hardness (GPa) | elasticity (GPa) |
| Example 1 | 15 | 1.80 | 30 | 1.46 | 3.8 | 12.5 |
| Example 2 | 15 | 1.75 | 30 | 1.46 | 3.8 | 12.5 |
| Example 3 | 15 | 1.70 | 30 | 1.46 | 3.8 | 12.5 |
| Example 4 | 15 | 1.85 | 30 | 1.46 | 3.8 | 12.5 |
| Example 5 | 40 | 1.85 | 30 | 1.46 | 3.8 | 12.5 |
| Comparative Example 1 | 15 | 1.55 | 30 | 1.46 | 3.8 | 12.5 |
| Comparative Example 2 | 15 | 1.80 | — | — | 3.0 | 12.5 |
| Comparative Example 3 | — | — | 30 | 1.46 | 2.8 | 12.4 |
| Comparative Example 4 | — | — | — | — | 0.8 | 5.2 |
| Comparative Example 5 | 200 (Dielectric thin film) | 1.54 | 30 (Wet SiO$_2$) | 1.46 | 1.5 | 6.0 |

| | Electrical resistance on surface (Ω/□) | Reliability R/R0 | Transmissivity of visible light (%) | Durability against input by pen in vicinity of peripheral portions (%) | Durability against input by pen under application of high load (%) |
|---|---|---|---|---|---|
| Example 1 | 300 | 1.1 | 90 | 1.0 | 1.0 |
| Example 2 | 300 | 1.1 | 90 | 1.0 | 1.0 |
| Example 3 | 300 | 1.1 | 90 | 1.0 | 1.0 |
| Example 4 | 300 | 1.1 | 90 | 1.0 | 1.0 |
| Example 5 | 300 | 1.1 | 90 | 1.0 | 1.0 |
| Comparative Example 1 | 300 | 1.1 | 90 | 1.0 | 20 |
| Comparative Example 2 | 300 | 1.5 | 88 | 1.0 | 1.0 |
| Comparative Example 3 | 300 | 1.1 | 89 | 1.5 | 50 |
| Comparative Example 4 | 200 | 1.1 | 87 | 50 | 50 |
| Comparative Example 5 | 250 | 1.1 | 90 | 20 | 20 |

As described above, the present invention provides a structure where an SiO$_x$ film having a thickness of 1 nm to 30 nm and a relative index of refraction of 1.6 to 1.9, an SiO$_2$ film having a thickness of 10 nm to 50 nm and a transparent conductive thin film having a thickness of 20 nm to 35 nm are sequentially layered on at least one surface of a transparent base film, and therefore, the durability against input by pen can be increased over a long period of time even in a touch panel having a narrow frame, and in particular, the durability against input by pen in the vicinity of the peripheral portions becomes excellent. In addition, excellent properties are simultaneously exhibited in terms of the electrical resistance on the surface, the ratio of change therein and the transmissivity, and therefore, the present invention is appropriate for use in, for example, PDA's, car navigation systems and smart phones.

The specific embodiments or examples described in the item "DESCRIPTION OF THE EMBODIMENTS" are merely embodiments or examples made the technical contents of the present invention evident. Thus, the present invention should not be limited to such specific examples, and should not be interpreted in a narrow sense. The present invention can be modified into various manners within the scope of the sprit of the present invention and the following claims.

What is claimed is:

1. A transparent conductive multilayer body, characterized by comprising:
   a transparent film base;
   an SiO$_x$ film (x is no less than 1.5 and less than 2) which is provided on one surface of said film base in accordance with a dry process, and has a thickness of 1 nm to 30 nm and a relative index of refraction of 1.6 to 1.9;
   an SiO$_2$ film which is provided in direct contact with said SiO$_x$ film and has a thickness of 10 nm to 50 nm; and
   a transparent conductive thin film which is provided in direct contact with said SiO$_2$ film and has a thickness of 20 nm to 35 nm.

2. The transparent conductive multilayer body according to claim 1, characterized in that
   a resin layer is provided on at least one surface of said film base.

3. The transparent conductive multilayer body according to claim 1, characterized in that
   a transparent substrate is bonded to the surface on the opposite side of said film base with a transparent pressure-sensitive adhesive layer in between.

4. The transparent conductive layer body according to claim 1, characterized in that
   said conductive thin film is made of crystalline indium tin oxide having a crystal grain diameter of no greater than 200 nm and a crystal content which exceeds 50%.

5. The transparent conductive multilayer body according to claim 1, characterized in that
   the hardness on the side on which said conductive thin film is layered is no less than 2 GPa.

6. The transparent conductive multilayer body according to claim 1, characterized in that
   the modulus of elasticity on the side on which said conductive thin film is layered is no less than 8 GPa.

7. A touch panel, characterized by having the transparent conductive multilayer body according to claim 1 and a lower substrate placed to face each other with a spacer in between.

* * * * *